United States Patent
Truc

(10) Patent No.: US 6,370,804 B1
(45) Date of Patent: Apr. 16, 2002

(54) CARDBOARD-PLASTIC SLIDE MOUNT

(75) Inventor: James A. Truc, Eden Prairie, MN (US)

(73) Assignee: Eastman Kodak Company, Rochester, NY (US)

( * ) Notice: Subject to any disclaimer, the term of this patent is extended or adjusted under 35 U.S.C. 154(b) by 1092 days.

(21) Appl. No.: 08/534,110

(22) Filed: Sep. 26, 1995

(51) Int. Cl.[7] .............................................. A47G 1/06
(52) U.S. Cl. ........................................ 40/702; 40/709
(58) Field of Search .................................. 40/702, 709

(56) References Cited

U.S. PATENT DOCUMENTS

| | | | |
|---|---|---|---|
| 1,467,108 A | * 9/1923 | Hodgson | 40/702 |
| 1,500,025 A | 7/1924 | Mayer | |
| 2,184,007 A | * 12/1939 | Staehle | 40/702 |
| 2,227,973 A | 1/1941 | Hood | |
| 2,268,529 A | * 12/1941 | Stiles | 40/702 |
| 2,338,189 A | 1/1944 | Libby et al. | |
| 2,390,053 A | * 12/1945 | Bradford | 40/709 |
| 2,697,889 A | 12/1954 | Heim | |
| 2,842,883 A | * 7/1958 | Folwell et al. | 40/702 |
| 3,077,688 A | * 2/1963 | Friedman et al. | 40/702 X |
| 3,341,960 A | 9/1967 | Florjancic et al. | |
| 3,369,338 A | 2/1968 | Koeppe et al. | |
| 3,470,642 A | 10/1969 | Mundt et al. | |
| 3,470,643 A | 10/1969 | Koeppe et al. | |
| 3,478,456 A | 11/1969 | Mundt et al. | |
| 3,521,423 A | 7/1970 | Koeppe et al. | |
| 3,952,434 A | * 4/1976 | Florjancic | 40/709 |
| 4,104,818 A | 8/1978 | Hrabik | |
| 4,250,641 A | 2/1981 | Thompson | |
| 4,607,442 A | 8/1986 | Desmarais et al. | |
| 4,612,754 A | 9/1986 | Neuhold et al. | |

FOREIGN PATENT DOCUMENTS

| | | | |
|---|---|---|---|
| GB | 503937 | 4/1939 | 40/152 |
| GB | 2 086 610 | 5/1992 | |

* cited by examiner

*Primary Examiner*—B. Dayoan
*Assistant Examiner*—Andrea Chop
(74) *Attorney, Agent, or Firm*—Kinney & Lange

(57) ABSTRACT

A cardboard-plastic slide mount includes a cardboard bottom, a cardboard cover and a plastic brace between the bottom and the cover. The cardboard bottom and the cardboard cover include aligned film windows. The plastic brace is between the bottom and the cover to define a film nest for containing a film transparency.

22 Claims, 11 Drawing Sheets

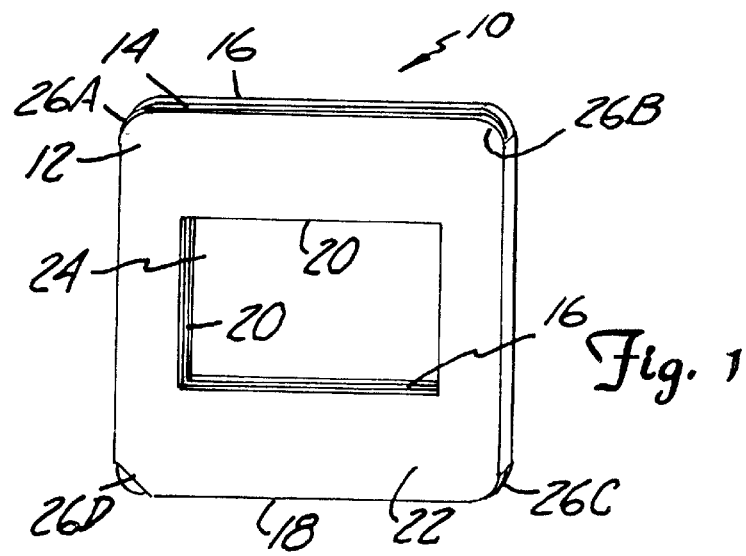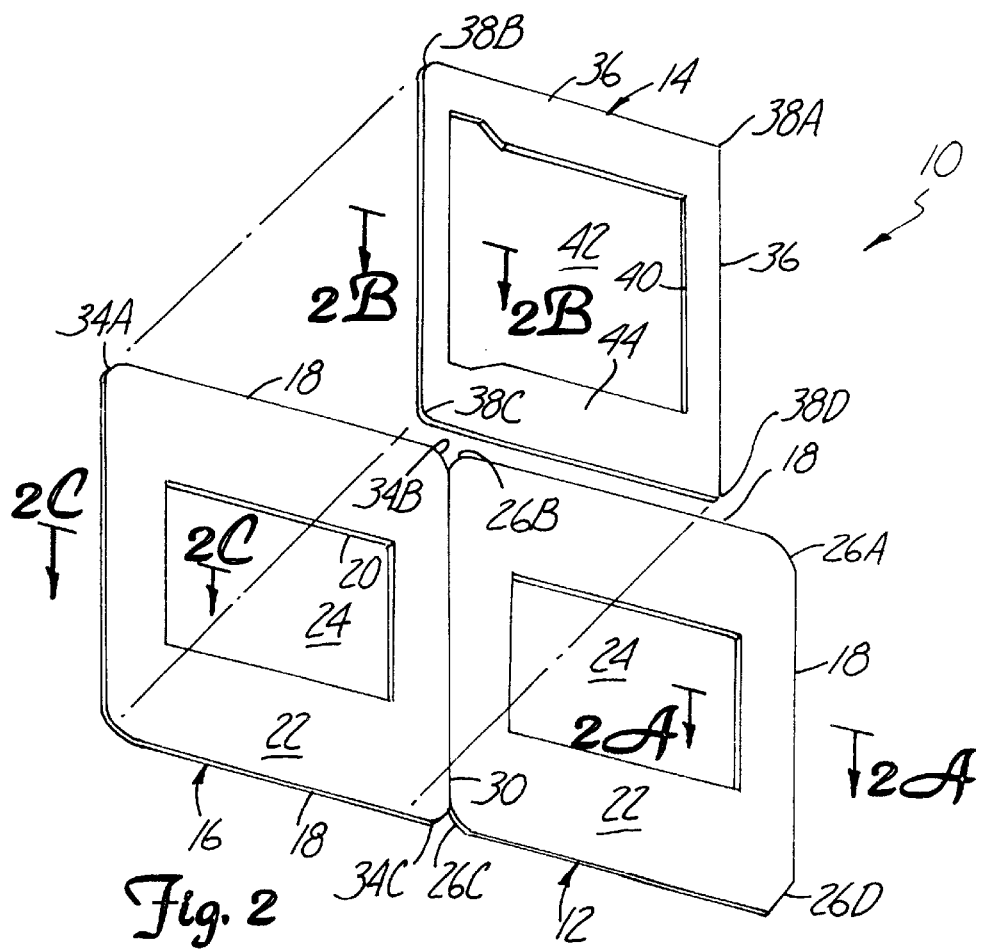

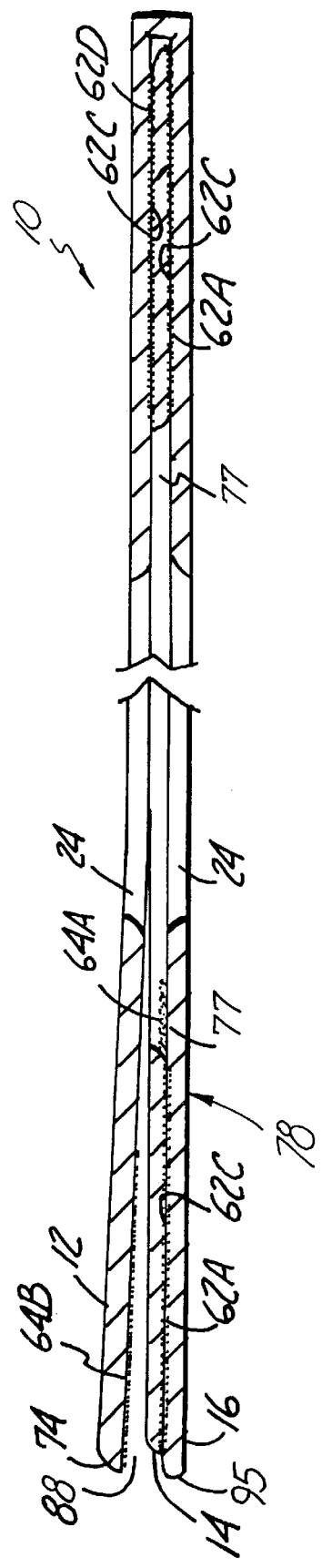

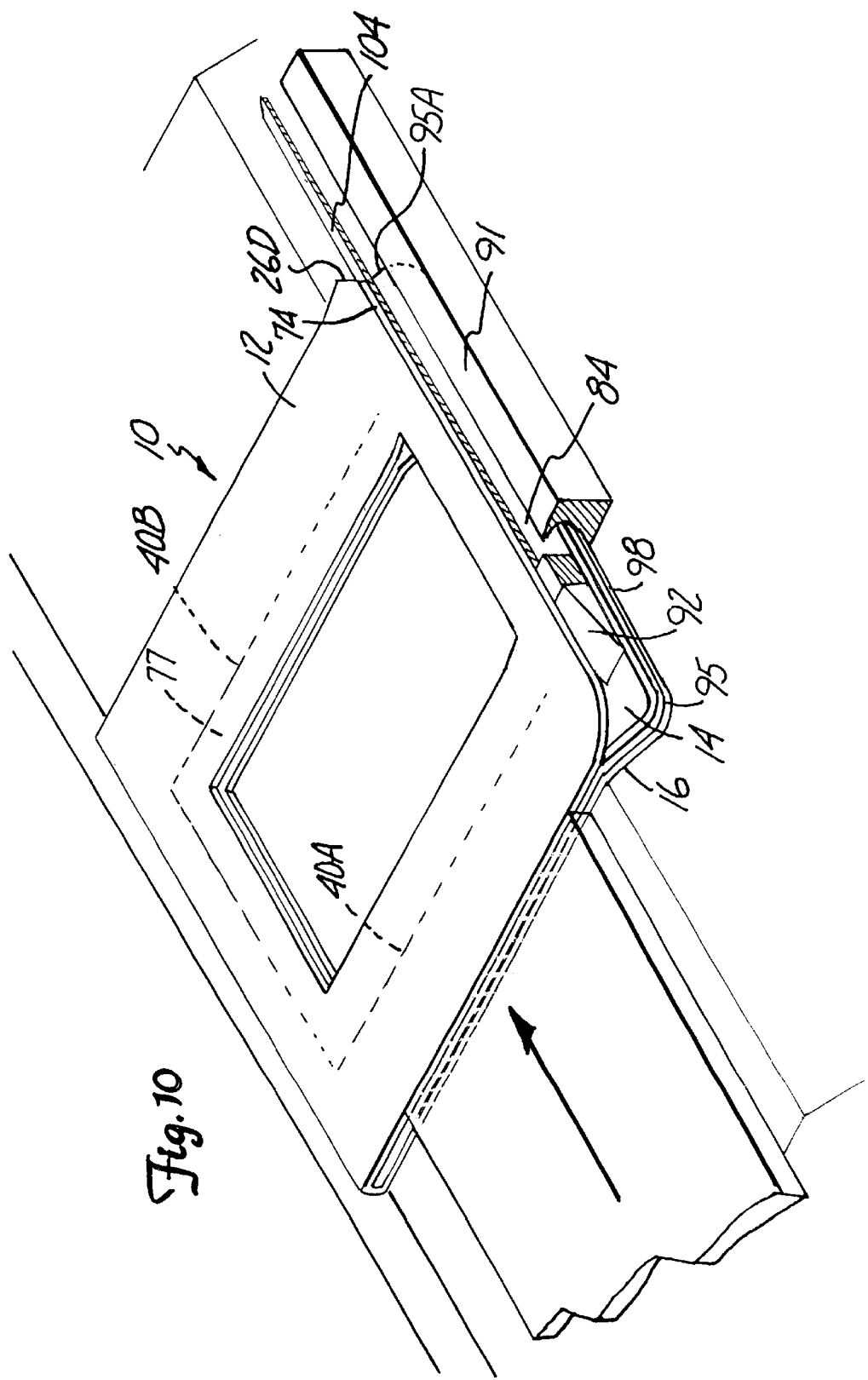

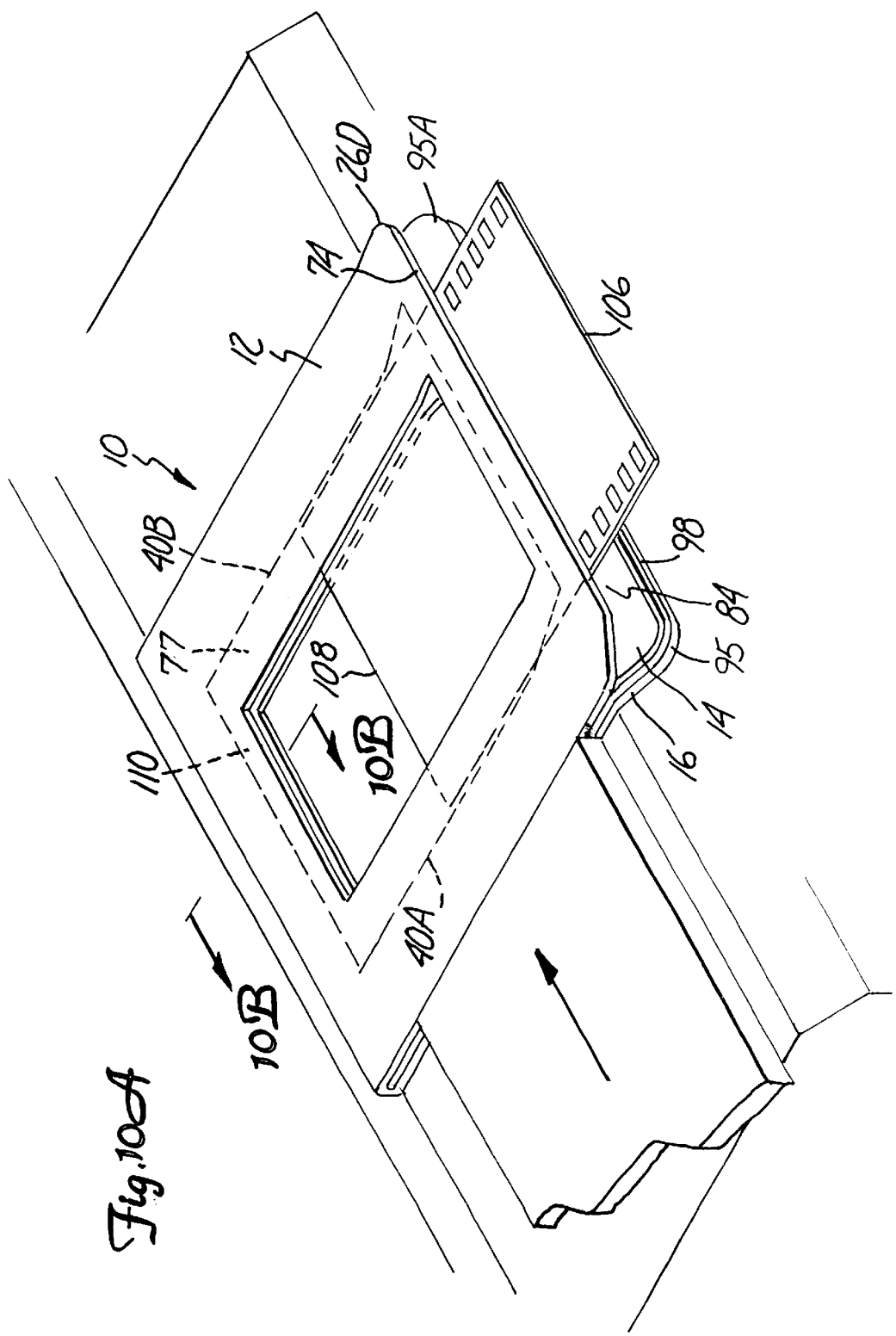

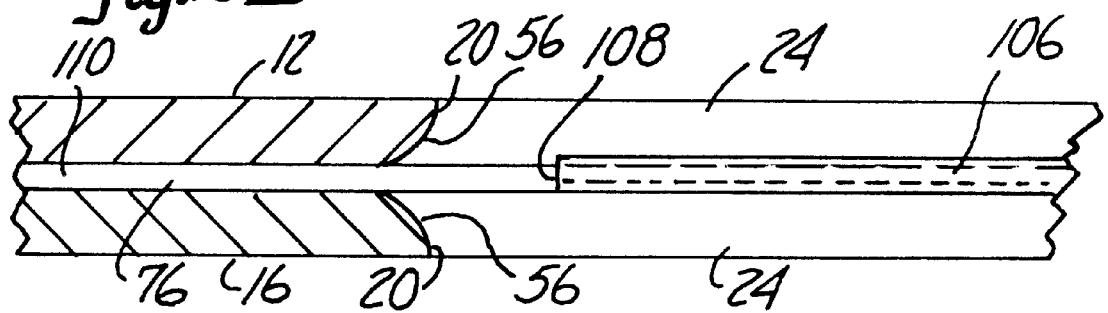
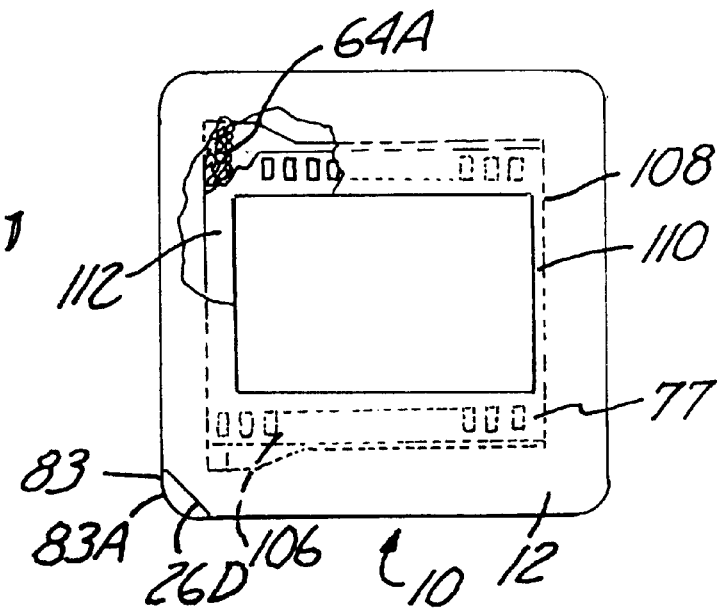

CARDBOARD-PLASTIC SLIDE MOUNT

BACKGROUND OF THE INVENTION

The present invention relates to a slide mount for mounting film transparencies from a photographic film web to prepare a photographic slide. In particular, the present invention relates to an improved cardboard slide mount which incorporates a plastic brace between opposing cardboard frames to give the slide mount increased strength and resiliency.

Photographic film transparencies are generally severed from a photographic film web and mounted in individual slide mounts to prepare photographic slides. The photographic image of the prepared photographic slide is then viewed in cooperation with a slide projector or other visualizing means.

Slide mounts used in the industry are generally made from either plastic or cardboard. Plastic slide mounts are generally formed of first and second plastic frame portions which are connected along three edges of an outer border to form a pocket therebetween. The plastic slide mounts include a central aperture which is formed by film windows in each of the first and second plastic frame portions. Plastic slide mounts also include a slit along a fourth edge of the outer border. The slit provides an opening through which a photographic film transparency is inserted into the pocket between the first and second frame portions. The fourth edge of the first and second frame portions is easily spaced apart by an opening assembly, which allows an individual film transparency to be quickly and efficiently inserted into the pocket of the slide mount.

Cardboard slide mounts are typically significantly less expensive than plastic slide mounts. Cardboard slide mounts are generally formed by first and second frame portions which are connected by a hinge. A cardboard spacer is usually bonded to an inner surface of the first frame portion so as to create a nest for the film transparency around a central rectangular aperture of the slide mount. With the first and second frame portions open in a butterfly-like position, the film transparency is placed in the film nest. The second frame portion is then folded atop the first frame portion, and the opposing inner surfaces of the first and second frame portions are bonded together about all four edges of the slide mount to secure the film transparency therein. This method of loading a film transparency into a cardboard slide mount is typically relatively slow as compared to the previously described method of loading a plastic slide mount.

With the film transparency secured within the slide mount, a photographic image of the film transparency should align with the film windows of the first and second frame portions. Thus, it is important that the film be correctly aligned and secured within the slide mount with the entire photographic image visible through the aperture of the slide mount. In some cardboard slide mounts, however, the film transparency is left unconnected within the film nest so that the photographic image can shift and become partially obscured by the rectangular aperture.

It is also important that the film transparency be capable of adapting to temperature variations occasioned by the intense heat of a light source of a slide projector. In some cardboard slide mounts, the film transparency is secured to the slide mount about all four edges of the film. When such a slide mount is placed in the slide projector's light source, extreme heat from the light source causes the film to expand and buckle, which in turn causes the projected photographic image to become out of focus.

SUMMARY OF THE INVENTION

The present invention is a cardboard-plastic slide mount and a method of forming a slide mount. The cardboard-plastic slide mount includes a cardboard bottom with a first film window and a cardboard cover with a second film window. A plastic brace is secured to inner surfaces of the bottom and the cover to give the slide mount strength and resiliency.

In the preferred embodiments of the slide mount, the brace is secured along three outer edges of the bottom and cover such that the first and second film windows are aligned and an insertion opening is defined along a first side of the slide mount. The plastic brace includes an opening and defines a film nest between the bottom and cover. The insertion opening communicates with the film nest and allows a film transparency to inserted through the insertion opening and into the film nest. A first adhesive layer is positioned in the film nest along one of the film windows so as to hold one edge of the film transparency when the film transparency is positioned in the film nest. The cardboard-plastic slide mount of the present invention is therefore able to be quickly loaded with a film transparency through the insertion opening in a manner similar to plastic slide mounts. Once loaded, the first adhesive layer in the film nest secures only one edge of the film transparency, which allows the film transparency to expand without buckling in response to the heat of a slide projector's light source.

The method of the present invention includes providing a cardboard bottom having a first film window, providing a cardboard cover having a second film window, depositing a plastic layer on the cardboard bottom and securing the cardboard cover on the plastic layer so as to at least partially align the first and second film windows.

BRIEF DESCRIPTION OF THE DRAWINGS

FIG. 1 is an enlarged perspective view of a cardboard-plastic slide mount of the present invention.

FIG. 2 is an exploded view of the cardboard-plastic slide mount of the present invention.

FIG. 8 is a cross-sectional view of the cardboard-plastic slide mount of FIG. 6 taken along line 8—8.

FIG. 10 is an enlarged perspective view of the cardboard-plastic slide mount of FIG. 5 positioned on a slide mount opening assembly near a position for insertion of a film transparency.

FIG. 10A is an enlarged perspective view of the cardboard-plastic slide mount of FIG. 10 with the slide mount opening assembly partially removed to demonstrate insertion of a film transparency.

FIG. 10B is a greatly enlarged cross-sectional view of the slide mount of FIG. 10A taken along line 10B—10B.

FIG. 11 is a top view of the slide mount of FIG. 10A with a cover of the slide mount partially cut away to show the film transparency sealed within the slide mount.

DETAILED DESCRIPTION OF THE PREFERRED EMBODIMENTS

Figure 2A:
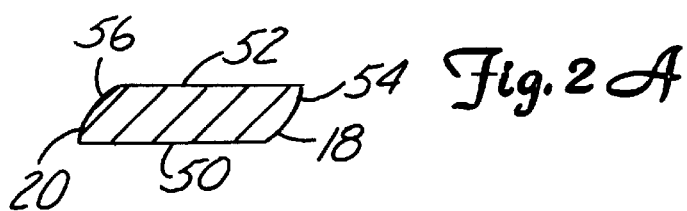
FIGS. 2A–2C are cross-sectional views of the cardboard-plastic slide mount of FIG. 2 taken along lines 2A—2A, 2B—2B and 2C—2C, respectively.

FIG. 1 is a perspective view of slide mount 10 of the present invention. Slide mount 10 generally includes cardboard cover 12, brace 14 and bottom 16. Slide mount 10 also includes outer edge 18 and inner edge 20, which generally defines border 22. Inner edge 20 further defines central aperture 24, which extends from cover 12 to bottom 16. Central aperture 24, which is rectangular in shape, provides a crisp edge for a projected picture when cardboard slide mount 10 is in use. In one preferred embodiment, corners 26A, 26B and 26C of cover 12 are radiused, while corner 26D is chamfered.

FIG. 2 is an exploded view of slide mount 10 of FIG. 1 in an unassembled condition. As shown in FIG. 2, cover 12 and bottom 16 are formed from a unitary piece of cardboard material with fold line 30 dividing cover 12 and bottom 16. In one preferred embodiment, slide mount 10 of FIG. 2 is formed from SBS-MD bleach stock cardboard which is known in the art. Because cover 12 and bottom 16 are formed from cardboard, slide mount 10 is more easily written upon. As can be seen, bottom 16 is generally a mirror image of cover 12. Thus, like corners 26A–26C of cover 12, corners 34A–34C of bottom 16 are radiused. Unlike corner 26D of cover 12, however, corner 34D of bottom 16 is radiused in a similar manner as corners 34A–34C.

Brace 14 is positioned between cover 12 and bottom 16 and 14 is formed from a plastic such as polystyrene. As can be appreciated, brace 14 may be formed from a variety of plastics. Preferably, the plastic chosen has a consistent thickness, a degree of rigidity sufficient to prevent undue warpage of slide mount 10 and a chemical inertness such that brace 14 will not chemically interact with or affect a film transparency. Brace 14 preferably comprises a generally flat layer of plastic material secured between cover 12 and bottom 16. Plastic brace 14 is preferably formed from a sheet of plastic material which is cut and dimensioned so as to fit between cover 12 and bottom 16. As can be appreciated, brace 14 may alternatively be formed by laminating, sputtering or coating the plastic material between cover 12 and bottom 16 and then allowing the plastic material to harden into a solid plastic layer.

Plastic brace 14 includes outer edge 36, which defines radiused corners 38A–38D, and inner edge 40, which defines opening 42. Opening 42 is larger than aperture 24 such that border 44 of plastic brace 14 is narrower than border 22 of cover 12 and bottom 16. Opening 42 defines a film nest 77 (shown in FIG. 4) that is generally sized to accept an individual film transparency. As a result, brace 14 also serves as a spacer. Alternatively, brace 14 may be secured between cover 12 and bottom 16 in addition to a distinct cardboard spacer.

Because brace 14 is formed from plastic material, slide mount 10 is strong, resilient and manufactured at a lower cost. Because brace 14 is formed from a plastic material, brace 14 rigidifies and strengthens the structural integrity of slide mount 10. As a result, slide mount 10 is less likely to be accidentally bent, torn or otherwise damaged. Plastic brace 14 also prevents corresponding warpage of the film transparency. At the same time, brace 14 does not increase the overall thickness of slide mount 10 to ensure that slide mount 10 easily inserts within the selected image projecting apparatus.

In addition, because plastic material has shape memory, the plastic material returns slide mount 10 to its original shape despite accidental or intended temporary deformation of slide mount 10. This is extremely advantageous in preclosed slide mounts which may require that an edge portion of the slide mount be temporarily bent or deformed to permit insertion of a film transparency. As a result, once the film transparency is inserted into a preclosed slide mount having brace 14, the portion temporarily bent or deformed for the insertion will return to its original shape to capture the film transparency. Also, because the plastic material forming brace 14 is generally smoother and has lower coefficients of friction than cardboard, brace 14 provides a better edge for guiding insertion of the film transparency into slide mount 10.

Moreover, plastic brace 14 also enables slide mounts 10 to be produced with less scrap and at a lower cost. Approximately 40% of the cost of producing slide mounts is associated with scrap materials from the production process. A major source of scrap material is the material cut away or removed to form apertures 24 and opening 42. Typically, the cardboard material cut away to form apertures 24 and opening 42 must be transported to a separate recycling facility, such as a paper plant, to be recycled. Because brace 14 is formed from a plastic material, the plastic material removed to form opening 42 may be simply reground on site and reused. As a result, recycling of the plastic scrap from brace 14 is simple and less expensive. Brace 14 enables slide mount 10 to be produced at a reduced cost.

Figure 2B:
Figure 2C:
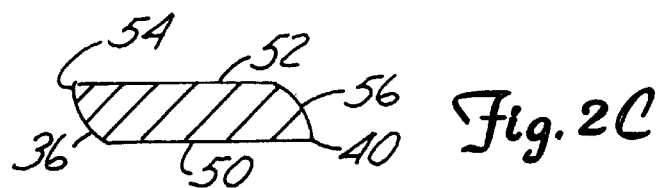

FIGS. 2A–2C are cross-sectional views of cardboard slide mount 10 of FIG. 2. As shown in FIGS. 2A–2C, outer edges 18 and 36 of slide mount 10 are preferably formed by a cutting die or mechanism which cuts in a direction from outer side 50 to inner side 52 of cardboard slide mount 10. As a result of this cutting direction, outer edges 18 and 36 include curved surface 54 which is directed towards outer side 50. Inner edges 20 and 40, however, are formed by a cutting die which cuts in a direction from inner side 52 to outer side 50. As a result of this cut, curved surface 56 of edges 20 and 40 is directed towards inner side 52. In a preferred embodiment, outer side 50 and inner side 52 define a cardboard thickness of about 0.020 millimeters. Brace 14 preferably has a thickness of about 0.008 millimeters. The orientation of the above-described cuts is such that the grain of the cardboard runs generally from plastic brace 14 to cover 12.

Figure 3:
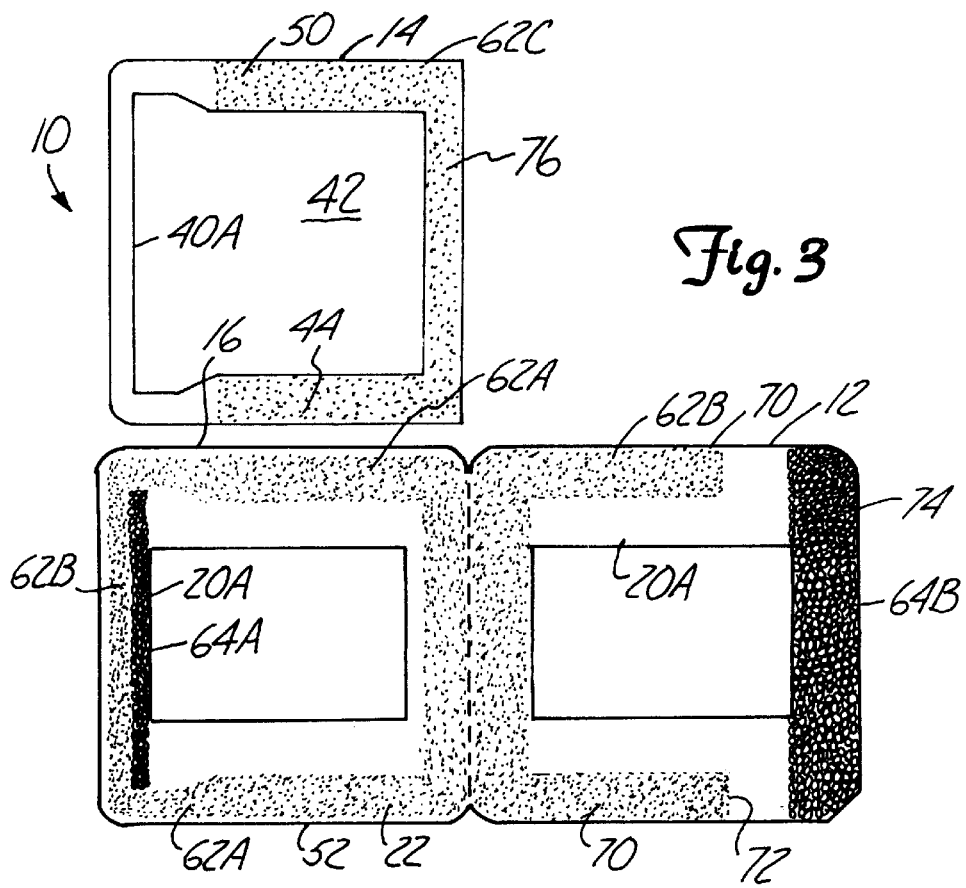
FIG. 3 is a top view of the cardboard-plastic slide mount of FIG. 2 with adhesives applied to the cardboard.

FIG. 3 is a top view of cardboard slide mount 10 in an unassembled state to show adhesive regions 62A–62C and 64A–64B applied to slide mount 10. Immediately prior to assembly, bottom 16 and brace 14 are processed so as to apply a first adhesive in the form of adhesive regions 62A and 62B to inner side 52 in the vicinity of each plastic brace 14, bottom 16 and cover 12, respectively, of each cardboard slide mount 10. The first adhesive forming regions 62A, 62B is preferably a heat seal adhesive commonly known in the art. Adhesive region 62A is a mirror image pattern of border 44 of plastic brace 14. Because border 44 is narrower than border 22, adhesive region 62A is spaced from inner edge 20 of bottom 16. Adhesive region 62B of cover 12 generally defines U-shaped pattern 70. Ends 72 of U-shaped pattern 70 are spaced from outer edge 74 of cover 12 by about 0.624 inches. Inner edge 70A of U-shaped pattern 70 is spaced from inner edge 20 of cover 12. The first adhesive is also applied to in the form of adhesive region 62C on outer side 50 of plastic brace 14. Adhesive region 62C is in U-shaped pattern 76 about border 44 of plastic brace 14. Ends of U-shaped pattern 76 are generally aligned with the taper of opening 42. U-shaped pattern 76 of adhesive region 62C is generally a mirror image of U-shaped pattern 70 of adhesive region 62B.

In addition, a second adhesive in the form of adhesive regions 64A and 64B is applied in the vicinity of each bottom 16 and cover 12, respectively, of each cardboard slide mount 10. In one preferred embodiment, the second adhesive forming regions 64A–64B is preferably a pressure-activated, micro-encapsulated adhesive, also commonly known in the art. Adhesive region 64A is located between inner edge 20A and adhesive region 62B of bottom 16. Adhesive region 64B is located adjacent to outer edge 74 of cover 12. Adhesive strip 64B preferably has a width of approximately 0.3 inches.

As can be appreciated, the first adhesive and the second adhesive may alternatively or additionally be applied to corresponding surfaces or regions of cover 12, brace 14 and bottom 16 opposite adhesive regions 62A, 62B, 64A, 64B. For example, the first adhesive may alternatively or additionally be applied to inner surface 52 (shown in FIG. 2B) of plastic brace 14 so as to completely cover inner surface 52 of border 44 in lieu of or in addition to the first adhesive forming region 62A of bottom 16. In addition, adhesive regions 62B may be omitted in favor of corresponding and opposite adhesive region 62C. To reduce the number of components to which adhesive must be applied, the first and second adhesives may alternatively be applied to corresponding regions on outer side 50 and inner side 52 of plastic brace 14. In such a modification, the first adhesive would additionally be applied to inner side 52 of plastic brace 14 to bond plastic brace 14 to bottom 16. Adhesive region 62C would adhesively bond plastic brace 14 to cover 12. The second adhesive would be applied to outer side 50 of border 44 adjacent to inner edge 40A. A variety of other adhesive application configurations may be employed to bond cover 12, brace 14 and bottom 16 together. In addition to the adhesives disclosed, any other suitable adhesives, such as a moisture activated adhesive, could perform the bonding functions described herein.

Figure 4:
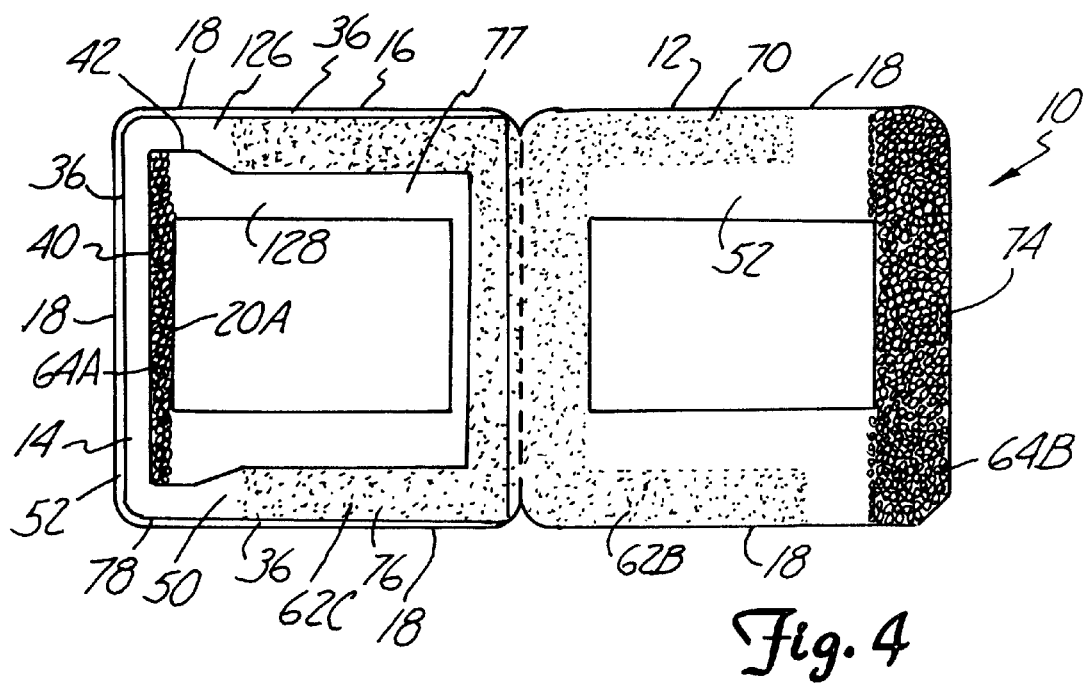
FIG. 4 is partially assembled top view of the cardboard-plastic slide mount of FIG. 3.

FIG. 4 is a top view of slide mount 10 with plastic brace 14 positioned against inner side 52 of bottom 16. As shown in FIG. 4, brace 14 is dimensioned so that outer edge 36 does not extend beyond outer edge 18 of bottom 16 and cover 12 when cardboard slide mount 10 is fully assembled. This assures that outer edge 36 of plastic brace 14 does not extend beyond outer edge 18 of bottom 16 in the event cover 12 is slightly misfolded. Opening 42 of plastic brace 14 frames aperture 24 of bottom 16 to create film nest 77, with adhesive region 64A exposed between inner edge 20A of bottom 16 and inner edge 40 of plastic brace 14.

Figure 5:
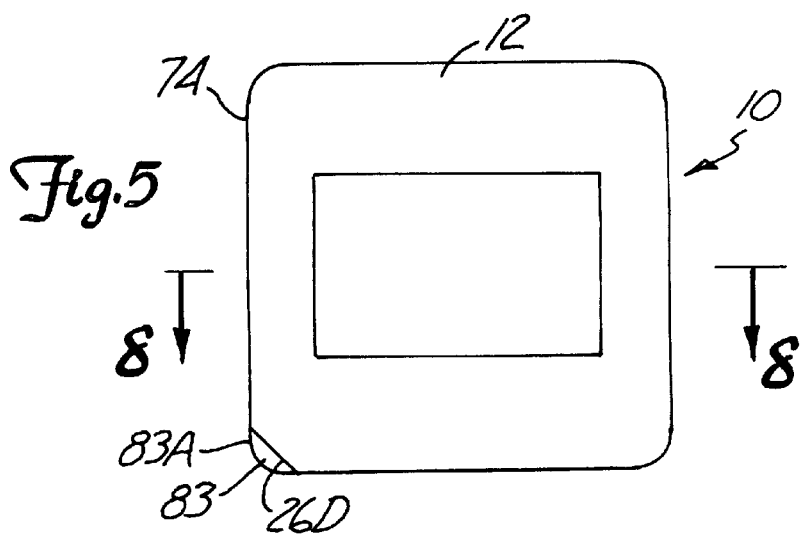
FIG. 5 is a completely assembled top view of the cardboard-plastic slide mount of FIG. 4.

FIG. 5 is a top view of cardboard slide mount 10 with inner side 52 of cover 12 folded against outer side 50 of plastic brace 14. Once cover 12 is folded atop plastic brace 14, heat sufficient to activate adhesive regions 62A–62C is applied to cardboard slide mount 10, which bonds inner side 52 of plastic brace 14 to inner side 52 of bottom 16 to form base 78. In addition, inner side 52 of cover 12 becomes partially bonded to outer side 50 of plastic brace 14 about U-shaped patterns 76 and 70. Adhesive regions 64A and 64B are not activated by the heating of cardboard slide mount 10.

As a result, cover 12 remains unbonded to base 78 along edge 74, which permits insertion of an individual film transparency into film nest 77. FIG. 5 also shows that corner 83A of base 78 is exposed by virtue of the chamfered cut of corner 26D of cover 12.

Figure 6:
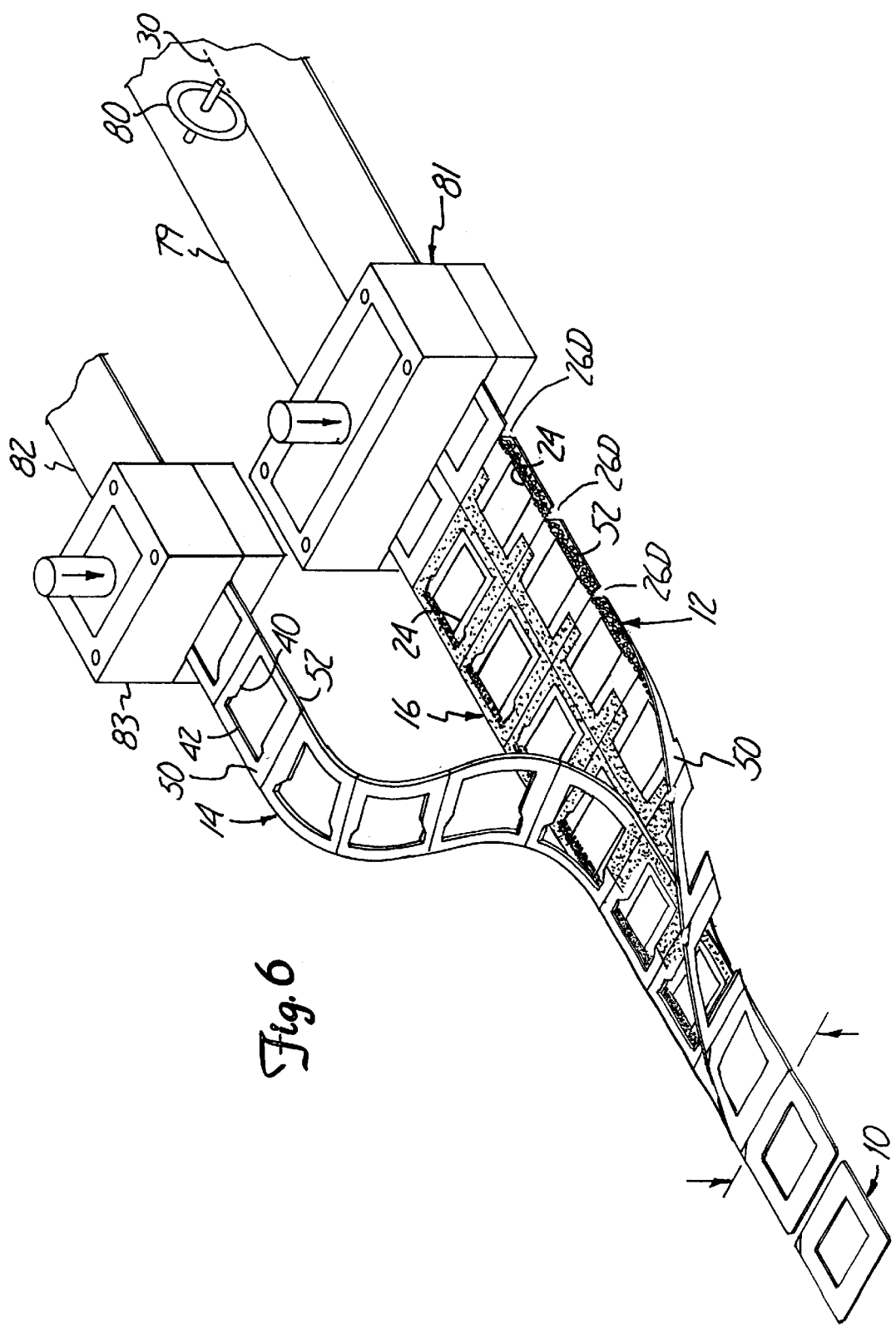
FIG. 6 is a diagrammatic illustration of a process for forming a slide mount of the present invention.

FIG. 6 is a diagrammatic illustration of a preferred method of forming and assembling slide mount 10. As shown by FIG. 6, cover 12 and bottom 16 are preferably formed from a single continuous sheet of cardboard 79 which is further processed to create fold line 30 dividing cover 12 and bottom 16. Preferably, fold line 30 is formed by scoring sheet 79 with scoring mechanism 80 as diagrammatically illustrated. Once fold line 30 dividing cover 12 and bottom 16 is formed, punching mechanism 81 (diagrammatically illustrated) punches and cuts side-by-side apertures 24 in each pair of covers 12 and bottoms 16 on opposite sides of fold line 30 in cardboard sheet 79. Because cutting mechanism 81 cuts in a direction from inner side 52 to outer side 50 of sheet 79, cutting mechanism 81 forms curved surfaces 56 of edges 20 and 40 as shown in FIGS. 2A–2C. Cutting mechanism 81 additionally cuts and removes a corner portion from each cover 12 to form chamfered corner 26D in each cover 12. As can be appreciated, the cutting of aperture 24 and corner 26D may alternatively be performed by multiple distinct cutting mechanisms.

As shown by FIG. 6, plastic brace 14 is preferably formed from an elongate continuous sheet 82 of plastic material which is cut at spaced intervals by cutting mechanism 83 (diagrammatically illustrated) to form openings 42 with braces 14. Cutting mechanism 83 preferably cuts in a direction from outer surface 50 to inner surface 52 so that curved surface 56 of edge 40 is directed towards inner side 52.

Once the elongate sheet from which covers 12, bottoms 16 and plastic braces 14 are cut, the first and second adhesives are applied to necessary surfaces of each cover 12, bottom 16 and brace 14 so as to secure the elongate, continuous sheet of plastic material 82 containing braces 14 to bottom 16 of cardboard sheet 79. As discussed above with respect to FIG. 4, adhesive is applied to form adhesive regions 62A, 62B, 62C and adhesive regions 64A and 64B. As can be appreciated, adhesive may be alternatively applied to corresponding opposite contact surfaces of cover 12, bottom 16 and brace 14.

Once adhesive is applied, sheet 82 containing plastic braces 14 is positioned so as to overlay bottoms 16 of sheet 79. Each brace 14 of sheet 82 is positioned so that each opening 42 is in at least partial alignment with opening 24 of each bottom 16.

Covers 12 of sheet 79 are folded about fold line 30 so that each cover 12 overlays a corresponding brace 14 and bottom 16. Cover 12 is folded so that aperture 24 of cover 12 is in substantial alignment with aperture 24 and opening 42 of a corresponding bottom 16 and brace 14, respectively. Once each cover 12 is folded about fold line 30 so as to capture brace 14 between bottom 16 and cover 12, adhesive regions 62A, 62B and 62C are activated to secure a plastic brace 14 between a corresponding cover 12 and bottom 16. As can be appreciated, various other adhesive materials or coupling mechanisms may be used to secure each brace 14 between its respective cover 12 and bottom 16 to form slide mount 10.

Once sheet 82 containing plastic braces 14 is fixedly secured or coupled between cover 12 and bottoms 16 to form an elongate composite strip of a plurality of preclosed slide mounts 10, the elongate composite strip is severed to separate the strip into individual preclosed slide mounts 10 ready for receiving film transparencies. Alternatively, film transparencies may be positioned between each plastic brace 14 and cover 12 prior to the folding of each cover 12 about fold line 30 and the securing of each cover 12 to brace 14. Covers 12 may then be folded atop the film transparency and secured to plastic brace 14 to at least partially secure the film transparency between cover 12 and brace 14.

Furthermore, in lieu of forming plastic brace 14 from a separate, distinct sheet of plastic material 82, plastic brace 14 may be formed by alternatively laminating, sputtering or coating inner side 52 of bottom 16 or cover 12 with a plastic material which is allowed to harden into a solid plastic layer. The shape or outline of plastic brace 14 may be defined by stenciling, by cutting and removing unwanted portions of the plastic layer or by similar controlled deposition or removal techniques.

Figure 7:
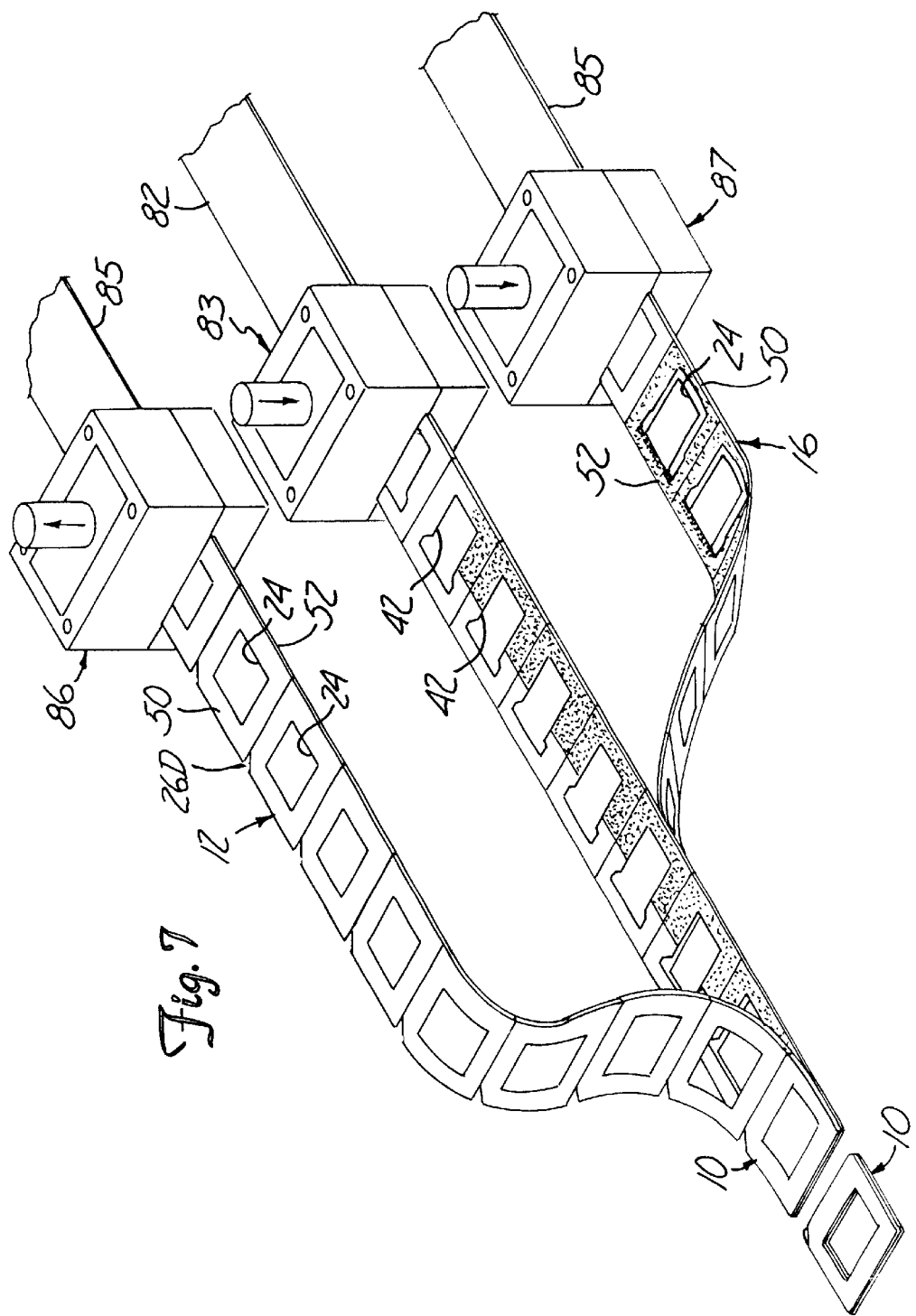
FIG. 7 is a diagrammatic illustration of an alternate process for forming the slide mount of the present invention.

FIG. 7 diagrammatically illustrates an alternative method for forming slide mounts 10. As illustrated by FIG. 7, cover 12 and bottom 16 are formed from separate individual elongate cardboard sheets 84, 85, respectively. Cutting mechanism 86, diagrammatically shown, cuts aperture 24 through each cover 12 and also cuts a corner portion of each cover 12 to form chamfered corners 26D. Cutting mechanism 86 preferably cuts in a direction upward through each cover 12 from inner side 52 to outer side 50. Similarly, cutting mechanism 87 cuts and forms aperture 24 through each bottom 16. Preferably, cutting mechanism 87 cuts downward through each bottom 16 of sheet 85 in a direction from inner side 52 to outer side 50.

Brace 14 is formed similarly to the method diagrammatically illustrated in FIG. 6. Because cover 12 and bottom 16 are formed from separate cardboard sheets 85, scoring to create the fold line and folding the sheet about a fold line is not necessary. As in the process illustrated in FIG. 6, the first and second adhesives are applied to necessary surfaces of each cover 12, bottom 16 and plastic brace 14 to secure each plastic brace 14 between cover 12 and bottom 16. Each brace 14 is positioned between a corresponding cover 12 and bottom 16 so as to at least partially align opening 42 with opening 24. Once the first adhesive is activated to bond each cover 12, bottom 16 and brace 14 to form a composite elongate strip of slide mounts 10, the elongate strip is severed to form individual slide mounts 10.

FIG. 8 is a cross-sectional view of cardboard slide mount 10 of FIG. 5 taken along lines 8—8. For illustration purposes, cover 12 is shown slightly spaced from base 78. As shown in FIG. 8, insertion opening 88 exists between cover 12 and base 78. Insertion opening 88 communicates with film nest 77, which allows an individual film transparency to be passed through insertion opening 88 and into film nest 77. Thereafter, under suitable pressure to activate the second adhesive, an edge of the individual film transparency is secured within film nest 77 along adhesive region 64A, and cover 12 is bonded to base 78 along adhesive region 64B. Adhesive region 64A serves to hold the individual film transparency in a fixed position within film nest 77. By being secured only along adhesive region 64A, the individual film transparency is capable of expanding and contracting when subjected to extreme temperatures produced by a light source of a slide projector so as to avoid any warping of the film transparency which might affect the focus of the projected picture. Cardboard slide mount 10 has a finished thickness of about 0.048 millimeters.

Figure 9A:
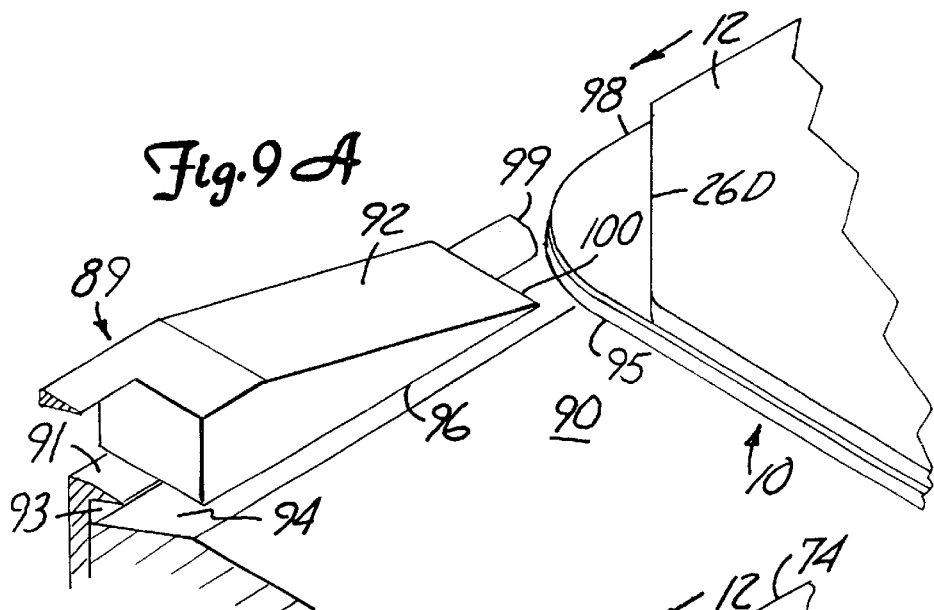
FIGS. 9A–9C are greatly enlarged perspective views of a corner of the cardboard-plastic slide mount of FIG. 5 as it enters an slide mount opening assembly.
Figure 9B:
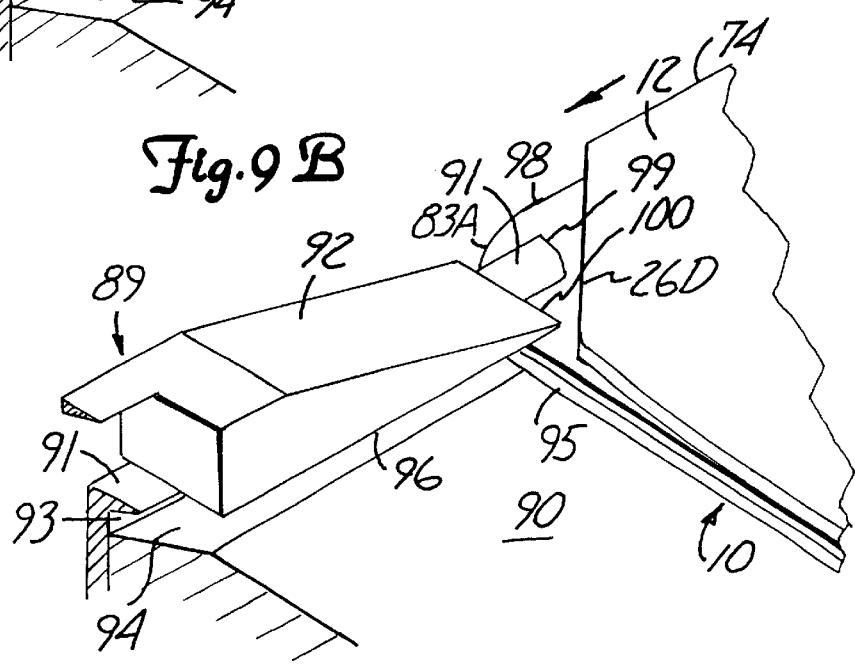
Figure 9C:
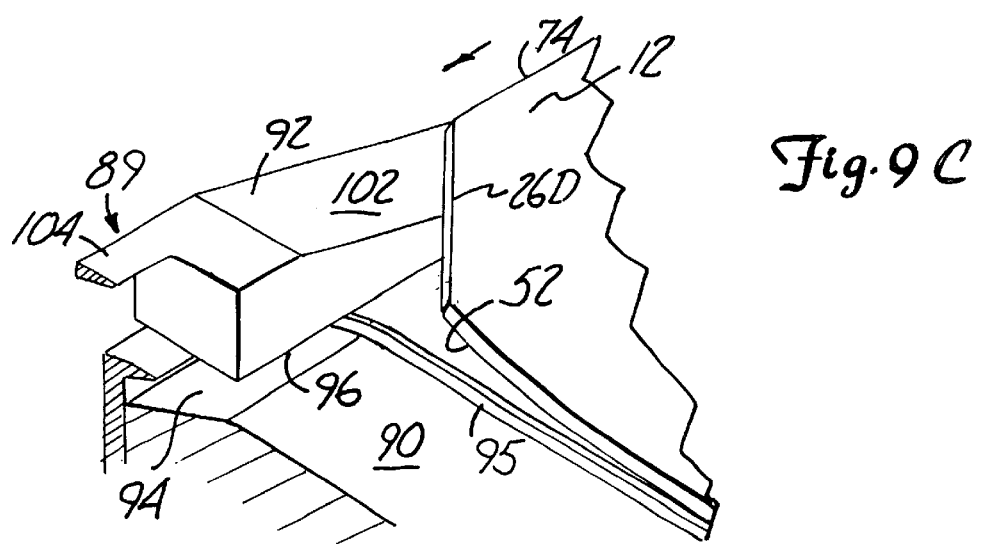

FIGS. 9A–9C are greatly enlarged perspective views of cardboard slide mount 10 which demonstrate one preferred manner of preparing cardboard slide mount 10 to accept an individual film transparency. Generally, cover 12 is separated from base 78 along edge 74 so as to expose insertion opening 88 and permit a film transparency to be inserted into film nest 77. As shown in FIG. 9A, cardboard slide mount 10 is placed on slide mount opening assembly 89. Slide mount opening assembly 89 generally includes base 90, ledge 91 and wedge 92. Base 90 includes beveled edge 94 which, as viewed in FIG. 9A, is beneath wedge 92. Beveled edge 94 of base 90 cooperates with ledge 91 to form slot 93. Wedge 92 is slightly elevated above base 90, which permits base 78 of cardboard slide mount 10 to pass beneath lower edge 96 of wedge 92. Leading edge 99 of ledge 91 extends beyond leading edge 100 of wedge 92 so that corner 95A of base 78 is engaged by ledge 91 before leading edge 100 of wedge 92 engages corner 26D of cover 12. Thereafter, slot 93 is designed to accept edge 98 of base 78.

As shown in FIG. 9B, cardboard slide mount 10 moves in the direction of the arrow with leading edge 99 of ledge 91 directing radiused corner 95A of base 78 into slot 93 before leading edge 100 of wedge 92 contacts corner 26D of cover 12. Slot 93 thereafter deflects edge 98 of bottom 83 downward in the direction of beveled edge 94 of base 90. Thus, as a result of the chamfering of corner 26D of cover 12, edge 98 of base 78 is separated from edge 74 of cover 12 before leading edge 100 of wedge 92 contacts corner 26D of cover 12. This assures that inner side 52 of cover 12 is slightly exposed before leading edge 100 of wedge 92 engages inner side 52 of cover 12.

As shown in FIG. 9C, as cardboard slide mount 10 continues moving in the direction of the arrow, inner side 52 of cover 12 is carried up ramped surface 102 of wedge 92 so as to direct outer edge 74 of cover 12 away from edge 98 of base 78. Cardboard slide mount 10 continues along slide mount opening assembly 89 in the direction of the arrow until edge 74 of cover 12 is resting on surface 104 of wedge 92.

FIG. 10 is an enlarged perspective view of cardboard slide mount 10 with slide mount opening assembly 89 partially cut away to demonstrate the insertion of a film transparency. As shown in FIG. 10, with edge 74 of cover 12 resting on surface 104, insertion opening 88 is thereby exposed. Space 105, between surface 104 and ledge 91, communicates with insertion opening 88 to allow an individual film transparency to enter insertion opening 88 and pass into film nest 77.

FIG. 10A is an enlarged perspective view of cardboard slide mount 10 of FIG. 9 with slide mount opening assembly 89 partially removed. As shown in FIG. 10A, with upper edge 74 of cover 12 and lower edge 98 of base 78 separated, film transparency 106 is able to pass through insertion opening 88 and into film nest 77. Inner edges 40A and 40B of plastic brace 14 serve to guide film transparency 106 into film nest 77. Film transparency 106 is fully inserted into film nest 77 when leading edge 108 of film transparency 106 lies within rear space 110 of film nest 77.

FIG. 10B is a sectional view of cardboard slide mount 10 of FIG. 10A taken along line 10B—10B. As shown in FIG. 10B, leading edge 108 of film transparency 106 is guided into rear space 110 of film nest 77 by virtue of curved surfaces 56 of inner edges 20 of cover 12 and bottom 16. Curved surfaces 56 assure that leading edge 108 of film transparency 106 does not bind upon entry into rear space 110 of film nest 77. Once film transparency 106 is properly seated within film nest 77, pressure sufficient to activate adhesive regions 64A and 64B is applied film mount 10 to secure cover 12 to base 78, as described earlier with respect to FIG. 8, and trailing edge 112 of film transparency 106 to adhesive regions 64A, as shown in FIG. 11.

Figure 12:
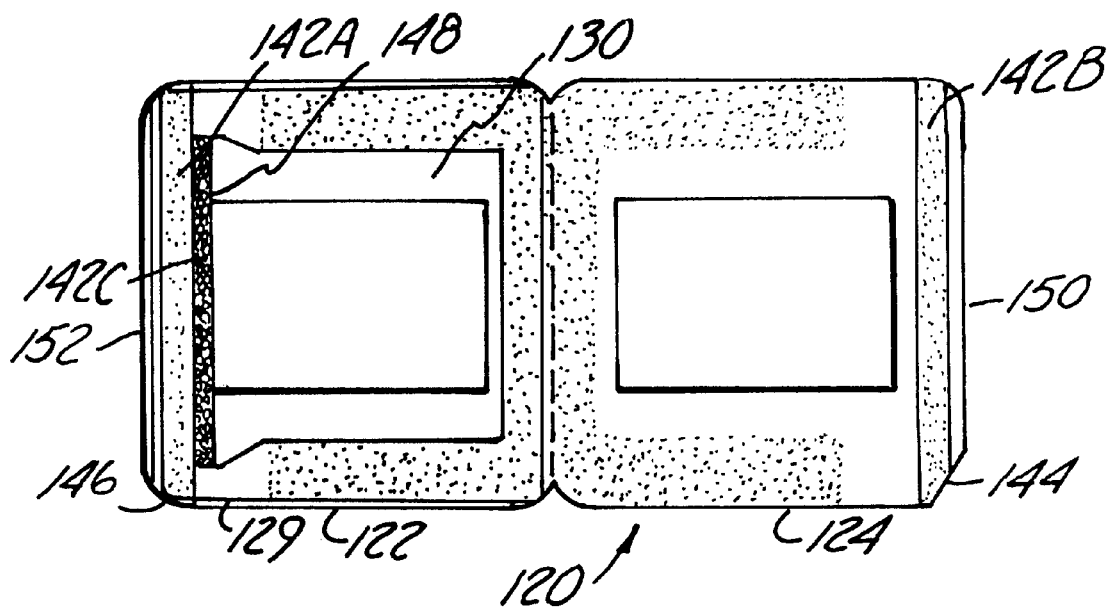
FIG. 12 is a partially assembled top view of the slide mount of FIG. 11 with an alternative adhesive pattern.

FIG. 12 is a partially assembled view of slide mount 120, an alternative embodiment of slide mount 10 of FIG. 1. Slide mount 120 includes adhesive regions 142A–142C. Adhesive regions 142A and 142B are applied to opposing ends of slide mount 120 so that when cover 14 is folded atop base 129, adhesive strip 144 lines up with adhesive strip 146. The adhesive forming regions 142A–142C is preferably a co-adhesive which is slightly tacky when dry. This allows adhesive strips 144 and 146 to bond together when cover 14 is folded atop base 129. In addition, adhesive region 142C, like adhesive region 64A of slide mount 10, secures one side of a film transparency within film nest 130 when adhesive strip 144 is connected to adhesive strip 146. In a preferred embodiment, adhesive strip 144 is spaced approximately 1/16 inch from edge 150 of cover 14, and adhesive strip 146 is spaced approximately 1/16 inch from edge 152 of base 129. This spacing ensures that an opening assembly, similar to opening assembly 89 shown in FIGS. 9A–9C, will be able to separate edges 150 and 152 in the event adhesive strips 144 and 146 become partially connected. In one preferred embodiment, adhesive strips 144 and 146 are approximately 1/8 inch wide.

Figure 13:
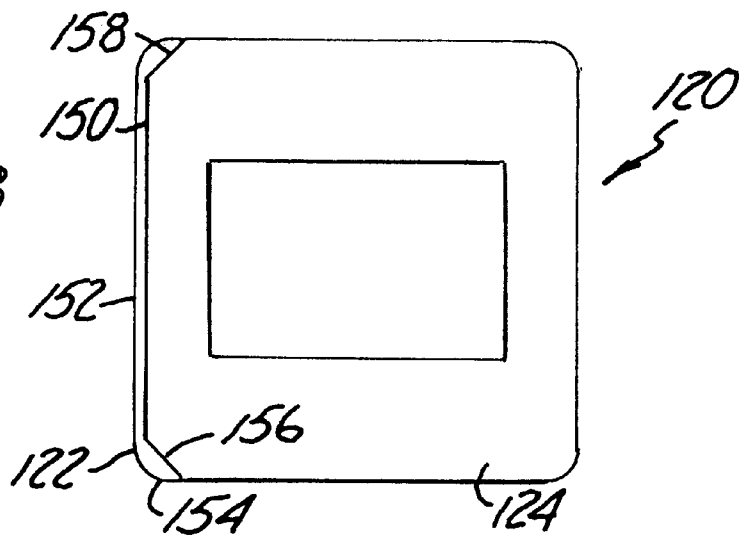
FIG. 13 is a top view of another alternative embodiment of the cardboard slide mount of FIG. 2.

FIG. 13 is a top view of another alternative embodiment of slide mount 120. As shown in FIG. 14, edge 150 of cover 14 is slightly recessed from edge 152 of base 129. By recessing edge 150, corner 154 of base 129 is able to pass into a slide mount opening assembly a greater distance before a wedge, similar to wedge 92 of FIGS. 9A–9C, engages corner 156 of cover 14. By further delaying contact of wedge 92 with corner 156 of cover 14, corner 154 of base 129 is deflected downward along beveled edge 94 of base 90 a greater distance, which decrease the opportunity for cardboard slide mount 120 to become jammed as wedge 92 engages corner 156 of cover 14. In addition, cover 14 includes second chamfered corner 158, which permits cardboard slide mount 120 to be opened by a different direction of travel through an opening assembly.

The preferred embodiments illustrate a pre-closed slide mount incorporating the plastic brace of the present invention. Each pre-closed slide mount offers the desirable benefit of allowing a film transparency to be loaded into the slide mount through a side entrance, which is known to be a quicker and more efficient manner of preparing a slide mount. The side opening of the slide mount of the present invention is made possible by chamfering at least one corner of the cover of the slide mount to permit an opening assembly to quickly and effectively separate the edges of opposing sides of the slide mount without damage to the slide mount. The inner edges of the opposing sides of the slide mount can then be bonded together by using a suitable adhesive. Because an edge of the film nest includes an adhesive strip, a film transparency is secured along one edge within the film nest which holds the position of the film transparency within the slide mount, yet allows the film to expand and contract in response to extreme temperatures experienced by the slide mount within slide projectors.

The slide mount incorporating the plastic brace of the present invention is significantly less expensive than side-opening slide mounts formed entirely from plastic as are typically used in the industry. The cardboard-plastic slide mount of the present invention, however, is also stronger and more resilient than conventional slide mounts formed entirely of cardboard. The plastic brace also provides a better edge for guiding transparencies into pre-closed slide mounts. In addition to being used with pre-closed slide mounts as described herein, the plastic brace of the present invention may also be utilized in cardboard slide mounts which are closed about a film transparency whereby the plastic brace would provide increased strength and resiliency to the transparency and the mount.

Although the present invention has been described with reference to preferred embodiments, workers skilled in the art will recognize that changes may be made in form and detail without departing from the spirit and scope of the invention.

What is claimed is:

1. A preclosed slide mount comprising:
   a bottom having a first film window;
   a cover having a second film window at least partially aligned with the first film window, wherein the bottom and the cover are formed from a cardboard material; and
   a plastic brace coupled between the bottom and the cover, wherein the plastic brace includes an aperture that is larger than the first and second windows and that defines boundaries of a film nest and wherein the bottom is bonded to the brace to form a base defining film nest between the base and the cover and to define an insertion opening along one side through which the film transparency can be inserted into the film nest.

2. The slide mount of claim 1 wherein the bottom is connected to the cover along a fold line.

3. The slide mount of claim 1 wherein the bottom and the cover are secured to the plastic brace.

4. The slide mount of claim 3 wherein the cover overlies the plastic brace and is bonded to the plastic brace.

5. The slide mount of claim 3 wherein the plastic brace overlies the bottom and is bonded to the bottom.

6. The slide mount of claim 1 wherein the plastic brace has a thickness of about 0.0008 millimeters.

7. The slide mount of claim 1 wherein the slide mount further includes:
   an adhesive layer adjacent the insertion opening for bonding the base and the cover to close the insertion opening after the film transparency has been inserted into the film nest.

8. The slide mount of claim 7 wherein the cover includes a chamfered outer edge adjacent the insertion opening.

9. The slide mount of claim 7 wherein the base and cover are bonded adhesively to one another along second, third and fourth sides.

10. The preclosed slide mount of claim 1 wherein the bottom and the cover are formed from a cardboard material.

11. A cardboard preclosed slide mount comprising a cardboard bottom with a first film window; a cardboard cover with a second film window; and a plastic brace between the cardboard bottom and the cardboard cover, wherein the plastic brace includes an aperture that is larger than the first and second windows and that defines boundaries of a film nest and wherein the bottom is bonded to the brace to form a base defining film nest between the base and the cover and to define an insertion opening along one side through which the film transparency can be inserted into the film nest.

12. The slide mount of claim 11 wherein the cover and the bottom are secured to the plastic brace.

13. The slide mount of claim 12 wherein the cover overlies the plastic brace and is bonded to the brace.

14. The slide mount of claim 12 wherein the plastic brace overlies the bottom and is bonded to the bottom.

15. The slide mount of claim 11 wherein the plastic brace has a thickness of about 0.0008 millimeters.

16. A method of forming a preclosed slide mount, the method comprising:

forming a first film window into a bottom;

forming a second film window into a cover, wherein the bottom and the cover are formed from a cardboard material;

forming a plastic brace with an aperture that is larger than the first and second windows and that defines boundaries of a film nest; and bonding the bottom to the plastic brace to form a base defining film nest between the base and the cover and to define an insertion opening along one side, through which the film transparency can be inserted into the film nest.

17. The method of claim 16 wherein the bottom is formed from the cardboard material and has a first inner surface and a first outer surface, wherein the cover has a second inner surface and a second outer surface and wherein the plastic layer is deposited on the inner surface of the bottom.

18. The method of claim 17 wherein the bottom is formed from the cardboard material and wherein providing a cardboard bottom having a first film window includes:

cutting through a cardboard sheet of material from the inner surface to the outer surface to form the first film window having beveled edges.

19. The method of claim 17 wherein the cover is formed from the cardboard material and wherein providing a cardboard cover having a second film window includes:

cutting through a cardboard sheet from the inner surface to the outer surface to form the second film window having beveled edges.

20. The method of claim 16 wherein bonding the plastic brace includes securing a plastic sheet to the cardboard material.

21. The method of claim 16 wherein bonding the plastic brace includes adhesively bonding a plastic sheet to the cardboard material.

22. The method of claim 16 wherein the cover and the bottom are formed from the cardboard material and wherein providing a bottom having a first film window and providing a cover having a second film window includes:

cutting a pair of side-by-side windows in a sheet of cardboard;

scoring the sheet of cardboard between the pair of side-by-side windows to create a fold line; and folding the sheet of cardboard about the fold line.

* * * * *